(12) United States Patent
Ridgway et al.

(10) Patent No.: US 7,016,555 B2
(45) Date of Patent: *Mar. 21, 2006

(54) ELECTROOPTIC MODULATORS AND WAVEGUIDE DEVICES INCORPORATING THE SAME

(75) Inventors: Richard W. Ridgway, Westerville, OH (US); Steven Risser, Reynoldsburg, OH (US); Vincent McGinniss, Sunbury, OH (US); David W. Nippa, Dublin, OH (US)

(73) Assignee: Optimer Photonics, Inc., Columbus, OH (US)

( * ) Notice: Subject to any disclaimer, the term of this patent is extended or adjusted under 35 U.S.C. 154(b) by 133 days.

This patent is subject to a terminal disclaimer.

(21) Appl. No.: 10/658,218

(22) Filed: Sep. 9, 2003

(65) Prior Publication Data
US 2004/0184694 A1  Sep. 23, 2004

Related U.S. Application Data

(60) Provisional application No. 60/455,978, filed on Mar. 19, 2003.

(51) Int. Cl.
*G02F 1/35* (2006.01)
(52) U.S. Cl. ............................ 385/3; 385/122; 385/145
(58) Field of Classification Search ...................... None
See application file for complete search history.

(56) References Cited

U.S. PATENT DOCUMENTS

| 5,220,627 A | 6/1993 | Kawano et al. |
| 5,533,151 A | 7/1996 | Leonard |
| 5,751,867 A | 5/1998 | Schaffner et al. |
| 5,835,644 A | 11/1998 | Oh et al. |
| 6,931,164 B1 * | 8/2005 | Risser et al. ................... 385/3 |
| 2003/0026572 A1 | 2/2003 | Ridgway et al. |
| 2003/0059189 A1 | 3/2003 | Ridgway et al. |
| 2003/0091259 A1 | 5/2003 | Ooi et al. |
| 2003/0169958 A1 | 9/2003 | Ridgway et al. |
| 2003/0174982 A1 | 9/2003 | Ridgway et al. |

FOREIGN PATENT DOCUMENTS

| EP | 0 444 688 A2 | 9/1991 |
| EP | 0513919 | 11/1992 |

(Continued)

OTHER PUBLICATIONS

Shi Y et al: "Low halfwave voltage electrooptic polymer modulators: design and fabrication", Proceedings of the SPIE—International Society for Optical Engineering, USA, vol., 3796, Jul. 1999, pp. 336-344.

(Continued)

*Primary Examiner*—Frank G. Font
*Assistant Examiner*—Michael P. Mooney
(74) *Attorney, Agent, or Firm*—Dinsmore & Shohl LLP

(57) ABSTRACT

According to the present invention, an improved waveguide device utilizes an advantageously designed optically functional cladding region and an associated modulation controller to address design challenges in applications requiring modulation, attenuation, control, switching, etc. of optical signals. In accordance with one embodiment of the present invention, an electrooptic modulator is provided comprising an optical waveguide, a cladding optically coupled to the optical waveguide, an optically functional cladding region defined in at least a portion of the cladding, and a modulation controller configured to provide a modulating control signal to the optically functional cladding region. The modulation controller is configured to generate an electric field in the optically functional region in response to a biased modulating RF control signal.

55 Claims, 11 Drawing Sheets

FOREIGN PATENT DOCUMENTS

| | | |
|---|---|---|
| EP | 0 987 580 A | 3/2000 |
| GB | A-2236402 | 4/1991 |
| GB | 2 371 431 A | 7/2002 |
| JP | 2000249994 | 9/2000 |

OTHER PUBLICATIONS

Teng C C: "Traveling-wave polymeric optical intensity modulator with more than 40 GHZ of 3-DB electrical bandwidth", Applied Physics Letters, American Institute of Physics, New York, US, vol. 60, No. 13, Mar. 30, 1992, pp. 1538-1540.

Chen et al., High-Frequency Polymer Modulators with Integrated Finline Transitions and Low V, IEEE Photonics Technology Letters, vol. 11, No. 1, Jan. 1999, p. 54-56.

Dr. H.F. Bulthuis, Analysis of Impedance and Velocity Matched High-Spped Traveling Wave Electro-Optic Modulators, Concept to Volume b.v., April 29, 1998, Application note A1998002, p. ii-12

* cited by examiner

ELECTROOPTIC MODULATORS AND WAVEGUIDE DEVICES INCORPORATING THE SAME

CROSS-REFERENCE TO RELATED APPLICATIONS

This application claims the benefit of U.S. Provisional Application Ser. No. 60/455,978, filed Mar. 19, 2003. The present application is also related to U.S. patent application Ser. No. 10/395,835, filed Mar. 24, 2003.

BACKGROUND OF THE INVENTION

The present invention relates to optical signal transmission and, more specifically, to improved waveguide devices useful in applications requiring modulation, attenuation, control, switching, etc. of optical signals.

BRIEF SUMMARY OF THE INVENTION

According to the present invention, an improved waveguide device utilizes an advantageously designed optically functional cladding region and an associated modulation controller to address design challenges in applications requiring modulation, attenuation, control, switching, etc. of optical signals. In accordance with one embodiment of the present invention, an electrooptic modulator is provided comprising an optical waveguide, a cladding optically coupled to the optical waveguide, an optically functional cladding region defined in at least a portion of the cladding, and a modulation controller configured to provide a modulating control signal to the optically functional cladding region. The optically functional cladding region defines a refractive index that is configured to vary in response to the modulating control signal applied to the optically functional region. The refractive index of the optically functional cladding region is lower than a refractive index of the optical waveguide at an operational wavelength and an operational temperature of the device. The modulation controller comprises a signal electrode and a ground electrode configured to generate an electric field in a portion of the optically functional region associated with the second optical waveguide arm in response to a control signal applied to the signal electrode. The modulation controller comprises a signal electrode and a ground electrode and is configured to generate an electric field in the optically functional region in response to a biased modulating RF control signal applied to the signal electrode. The modulation controller is configured to and isolate a DC voltage bias from a control signal input and a control signal termination of the signal electrode of the device.

In accordance with another embodiment of the present invention, an optical device is provided comprising an optical transmission line, a plurality of add channels and drop channels, an array of electrooptic modulators, an array of electrooptic switches, an "add" wavelength selective device, and a "drop" wavelength selective device. The optical transmission line is configured to carry a plurality of optical signals $\lambda_1, \lambda_2, \lambda_n$. The add channels are coupled to the optical transmission line via the array of electrooptic modulators, the array of electrooptic switches, and the "add" wavelength selective device. The plurality of drop channels are coupled to the optical transmission line via the array of electrooptic switches and the "drop" wavelength selective device.

The array of electrooptic switches are configured to drop, from the optical transmission line, a signal of a selected wavelength $\lambda_i$ while adding to the optical transmission line a corresponding signal of the selected wavelength $\lambda_i$ from one of the electrooptic modulators. Each of the electrooptic modulators comprises an optical waveguide, a cladding optically coupled to the optical waveguide, an optically functional cladding region defined in at least a portion of the cladding, and a modulation controller configured to provide a modulating control signal to the optically functional cladding region. The optically functional cladding region defines a refractive index that is configured to vary in response to the modulating control signal applied to the optically functional region.

In accordance with yet another embodiment of the present invention, an electrooptic modulator array is provided comprising an array of optical waveguides, respective pairs of optical waveguide arms, an optically functional cladding region, and a modulation controller comprising an array of signal electrodes and shared ground electrodes. The array of optical waveguides is configured to split a propagating optical signal into respective pairs of optical waveguide arms and recombine the optical signals. The optically functional cladding region is defined in at least a portion of a cladding optically coupled to the array of optical waveguides and is configured such that at least one of the optical waveguide arms of each pair of optical waveguide arms passes through the optically functional cladding region. The modulation controller is configured to provide a modulating control signal to the optically functional cladding region. The array of signal electrodes are dedicated to individual ones of the optical waveguide arms passing through the optically functional region. The signal and the ground electrodes are configured to generate respective electric fields in the optically functional cladding region in response to respective control signals applied to different ones of the signal electrodes. The signal and ground electrodes, the optically functional cladding region, and the array of optical waveguides are configured such that the respective electric fields generated in the optically functional cladding regions alter respective refractive indices associated with individual ones of the optical waveguide arms passing through the optically functional region.

Accordingly, it is an object of the present invention to provide for improvements in optical waveguide devices useful in applications requiring modulation and switching of optical signals. Other objects of the present invention will be apparent in light of the description of the invention embodied herein.

BRIEF DESCRIPTION OF THE SEVERAL VIEWS OF THE DRAWINGS

The following detailed description of specific embodiments of the present invention can be best understood when read in conjunction with the following drawings, where like structure is indicated with like reference numerals and in which.

DETAILED DESCRIPTION

Figure 1:
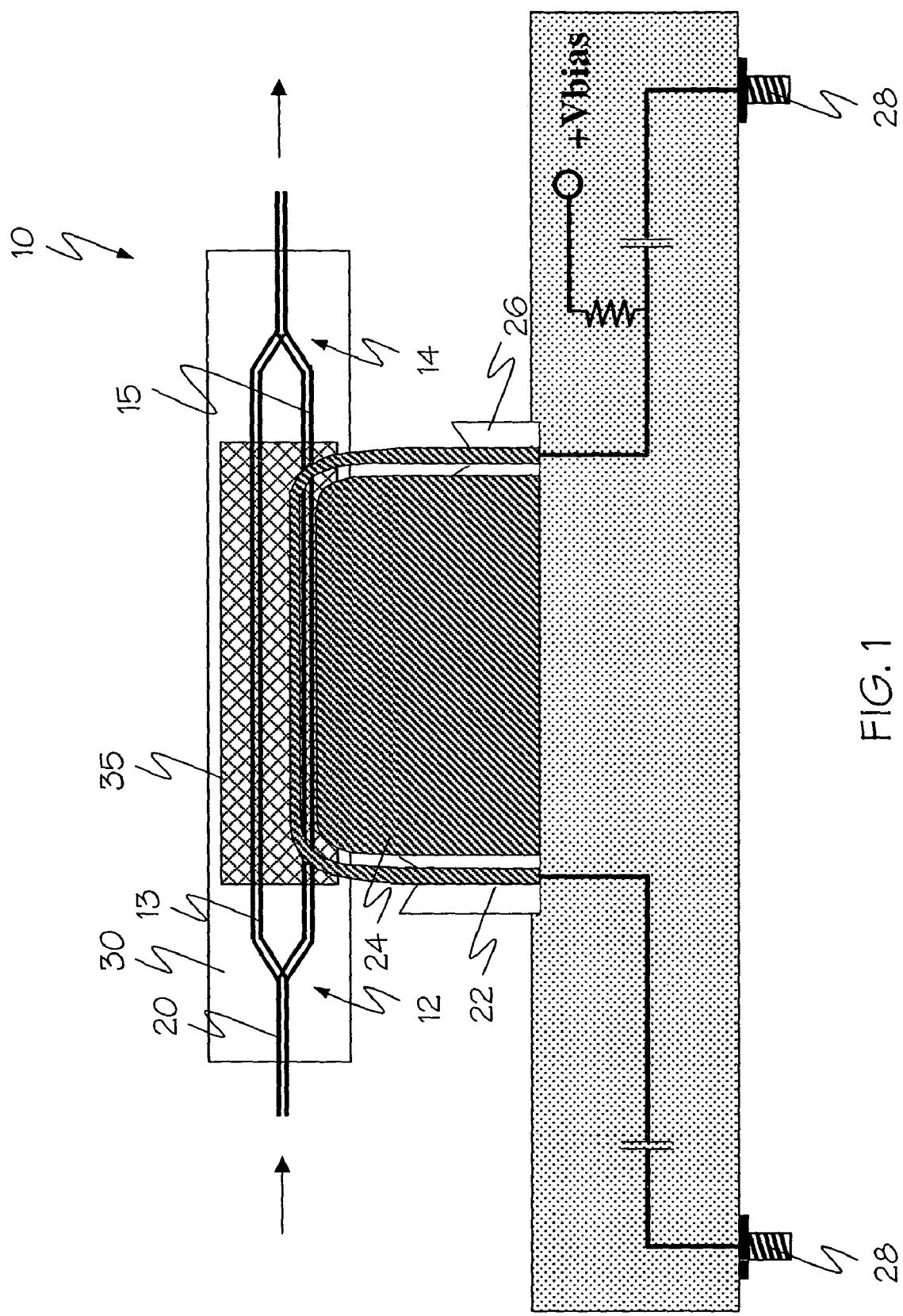
FIG. 1 is an illustration of an electrooptic modulator according to one embodiment of the present invention.

Referring initially to FIG. 1, an electrooptic modulator 10 according to the present invention is illustrated. Specifically, the electrooptic modulator 10 comprises an optical waveguide 20 and an associated cladding 30 optically coupled to the optical waveguide 20. In the illustrated embodiment, the waveguide 20 is configured to define an optical signal splitting region 12 near an input side of the electrooptic modulator 10 and an optical signal combining region 14 near an output side of the electrooptic modulator 10. The splitting region 12 defines first and second optical waveguide arms 13, 15.

The cladding 30 comprises an optically functional region 35 disposed between the optical signal splitting and combining regions 12, 14. The optically functional region 35, the characteristics and properties of which are described in further detail below, defines a refractive index that is lower than the refractive index of the optical waveguide 20 at the operating temperature of the modulator 10. In this manner, a substantial portion of light introduced into the waveguide 20 along an optical axis of the device remains confined within the waveguide and a substantial portion of the light is allowed to propagate in the optically functional region 35 of the cladding 30. It is contemplated that the cladding 30 and the optically functional region 35 may be formed of the same material.

For the purposes of defining and describing the present invention, it is noted that the respective "substantial" portions of light comprises portions significant enough to enable control of an output optical signal of the device through variations in the refractive index of the optically functional region of the cladding. It is also noted that, for the purposes of defining and describing the present invention, reference to the relative values of the refractive indices of the optically functional region and the optical waveguide are made with the inherent assumption that the relative values are taken at the operational wavelength and temperature of operation of the device, unless otherwise noted.

The refractive index of the optically functional region 35 varies in response to a control signal applied to the optically functional region 35. The nature of the control signal depends upon the nature of the device in which the present invention is employed. In the illustrated embodiment, the control signal comprises a modulating electrical signal in the form of, for example, an RF electric field E generated across a signal electrode 22 and a ground electrode 24. In the illustrated embodiment, the signal electrode 22 and the ground electrode 24 are formed on a cover plate 26 formed of silica, or another suitable material and the signal electrode includes a control signal input terminal 28A and a control signal termination 28B configured for convenient connection to a suitable source for generating a control signal. For the purposes of defining and describing the present invention, it is noted that RF control signals extend from about 10 kHz to over 300 GHz.

The optically functional region 35 of the cladding 30 is responsive to the intensity and orientation of the electric field E. Where the control signal comprises an electric field, the signal electrode 22 and the ground electrode 24 are configured to generate an electric field in the optically functional region 35 of the second optical waveguide arm 15, altering the refractive index of the optically functional region 35 of second optical waveguide arm 15. The output of the electrooptic modulator 10 varies as a function of the signal applied to the signal electrode 22 because the light in the second optical waveguide arm 15 is phase modulated due to the alteration in refractive index. As is described in further detail below, the manner in which the refractive index is altered may be governed by the Kerr Effect, the Pockels Effect, or a combination of the two electrooptic effects. When the optical signals in the respective arms recombine, the signals in each arm constructively or destructively interfere. This interference, and the control signal that creates the electrooptic effect, may be used to create optical intensity modulation at the output of the device.

The signal electrode 22 and the ground electrode 24 are configured to define a traveling wave electrode. In a traveling wave electrode, the RF signal propagates from the input end to the output end along with the optical wavefront. Thus, the control signal enters the circuit illustrated in FIG. 1, through the control signal input terminal 28A and propagates to the control signal termination 28B. The impedance of the electrode configuration is preferably matched to that of the signal source, typically 50 ohms. The first blocking capacitor $C_1$ allows propagation of an RF control signal while protecting the RF source from the large DC bias contributed by bias voltage source $+V_{bias}$. The role of the DC bias is described in further detail below. A termination resistor is typically provided across the signal electrode 22 and the ground electrode 24 at the control signal termination 28B. The value of the termination resistor may be selected to match the impedance Z of the traveling wave electrode configuration, which may be determined in a variety of manners, including use of the following formula:

$$Z = \frac{1}{v_{ph}C}$$

where $v_{ph}$ corresponds to the phase velocity of the traveling wave and C corresponds to the Capacitance per unit length of the traveling wave structure. A second blocking capacitor $C_2$ may be placed in line before the control signal termination 28B to keep the bias voltage $+V_{bias}$ from the termination resistor. In the above-noted equation, the capacitance C does not correspond to the values of either blocking capacitor $C_1$, $C_2$. By way of illustration, and not limitation, in one embodiment of the present invention, the impedance of the traveling wave electrode configuration is about 50 ohms, the width of the signal electrode/ground electrode stripline is about 3 mm, the thickness of the circuit board is about 1.5 mm, the dielectric constant of the board is about 4.2, the respective values of the capacitors $C_1$, $C_2$ is about 100 pF to about 1000 pF, and the resistance of the termination resistor is about 50 ohms.

Figure 2A:
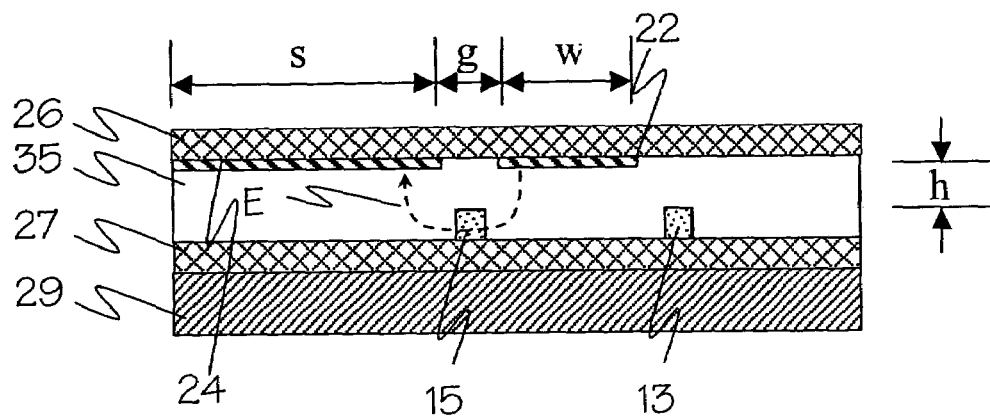
FIGS. 2A–2C are schematic illustrations, taken from a cross-sectional perspective, of waveguide devices according to some embodiments of the present invention.

FIG. 2A presents a schematic illustration of a suitable electrode configuration and resulting electric field E. Also illustrated in FIG. 2A are an additional silica layer 27 and a substrate 29 of, e.g., silicon. The signal electrode 22 and the ground electrode 24 are separated by a widthwise traveling wave electrode gap g. The second optical waveguide arm 15 passes through the optically functional region in substantial alignment with the traveling wave electrode gap g. The second optical waveguide arm 15 is offset from the common plane occupied by the signal electrode 22 and the ground electrode 24 by a distance h. The signal electrode 22 defines a widthwise dimension w and the ground electrode 24 defines a widthwise dimension s. Generally, the values for the dimensions g, w, and s are selected to achieve about 50 Ohms of impedance across the signal electrode 22 and the ground electrode 24, to be suitable for use with standard RF equipment. For example, where s is about 500 μm, a w/g ratio of about 9.3 will yield about 50 Ohms of impedance. More specifically, w may be set at about 140 μm and g may be set at about 15 μm.

Figure 2B:
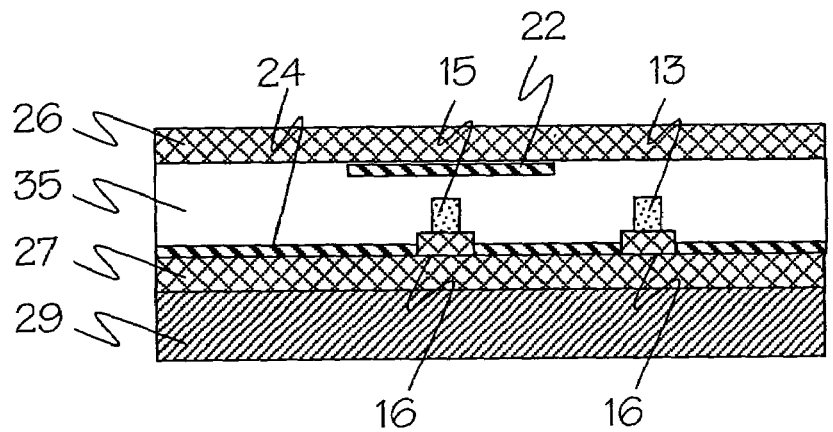
Figure 2C:
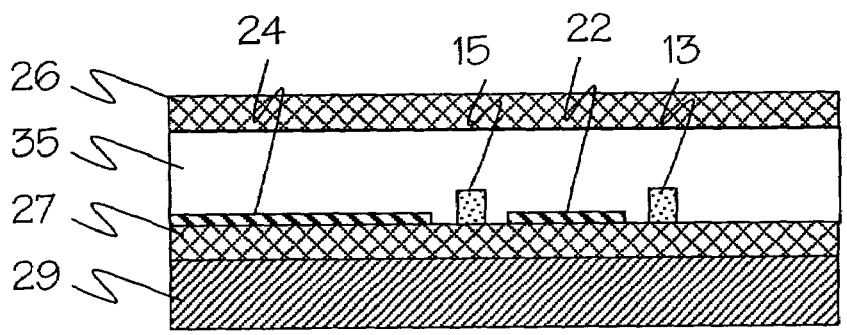

The values for the dimensions h, g, w, and s may also be configured to yield suitable electric field orientation and magnitude and to maintain appropriate optical signal propagation along the waveguide 15. According to certain embodiments of the present invention, h will have a value of about 8 μm or between about 5 μm and about 11 μm (where g is about 15 μm). Lower values lead to greater optical loss and higher values reduce the effect of the electric field. In FIG. 2C, the value of h is effectively zero because the signal electrode 22 and the ground electrode 24 have been positioned in the same buried plane as the waveguides 13, 15. The second optical waveguide arm 15 passes through the optically functional region in substantial alignment with the traveling wave electrode gap g. In such embodiments, the gap between the electrodes may be increased to, for example, about 30 μm while the value of w may remain about the same and the value of s may be reduced to about 220 μm.

Stated more broadly, referring to the embodiment of FIG. 2A, the waveguide, the signal electrode, and the ground electrode may be configured such that: the widthwise gap g is between about 2 μm and about 50 μm; the distance h is between about 0 μm and about 50 μm; the widthwise dimension w is between about 5 μm and about 500 μm; and the widthwise dimension s is between about 5 μm and about 2000 μm. More particularly, in some embodiments, the widthwise gap g is between about 10 μm and about 20 μm; the distance h is between about 5 μm and about 11 μm; the widthwise dimension w is between about 10 μm and about 200 μm; and the widthwise dimension s is between about 10 μm and about 500 μm.

Referring to the embodiment of FIG. 2C, the waveguide, the signal electrode, and the ground electrode may be configured such that: the widthwise gap g is between about 10 μm and about 50 μm; the distance h is about zero; the widthwise dimension w is between about 5 μm and about 500 μm; and the widthwise dimension s is between about 5 μm and about 2000 μm. More particularly, in some embodiments, the widthwise gap g is between about 15 μm and about 40 μm; the distance h is about zero; the widthwise dimension w is between about 10 μm and about 200 μm; and the widthwise dimension s is between about 10 μm and about 300 μm.

It is noted that a variety of additional electrode configurations will be suitable for generation of an electric field in the optically functional region 35 of the present invention. For example, referring to FIG. 2B, it is contemplated that the ground electrode 24 may be buried, i.e., positioned against the additional silica layer 27, while the signal electrode 22 is positioned against the cover plate 26. Waveguide spacers 16, formed of silica or another suitable material, may also be provided to position the waveguides 13, 15 between the ground electrode 24 and the signal electrode 22.

Regardless of the specific electrode configuration utilized in accordance with the present invention, optically functional regions 35 of the present invention may be well suited to respond to application of an RF control signal. Specifically, if the material of the optically functional region 35 is characterized by a high degree of orientational mobility and is able to transition between a substantially oriented state and a substantially isotropic state at a frequency of the applied RF control signal, the electrooptic modulator 10 may be configured to generate an RF modulated optical output signal. It is contemplated, for example, that a Kerr Effect medium characterized by a Kerr constant of at least about $3 \times 10^{-14}$ m/V$^2$ will provide signal modulation in excess of 1 GHz. In embodiments of the present invention where the Kerr Effect medium is to play a stronger role in signal modulation, it may be characterized by a Kerr constant of about $3 \times 10^{-12}$ m/V$^2$.

Figure 3:
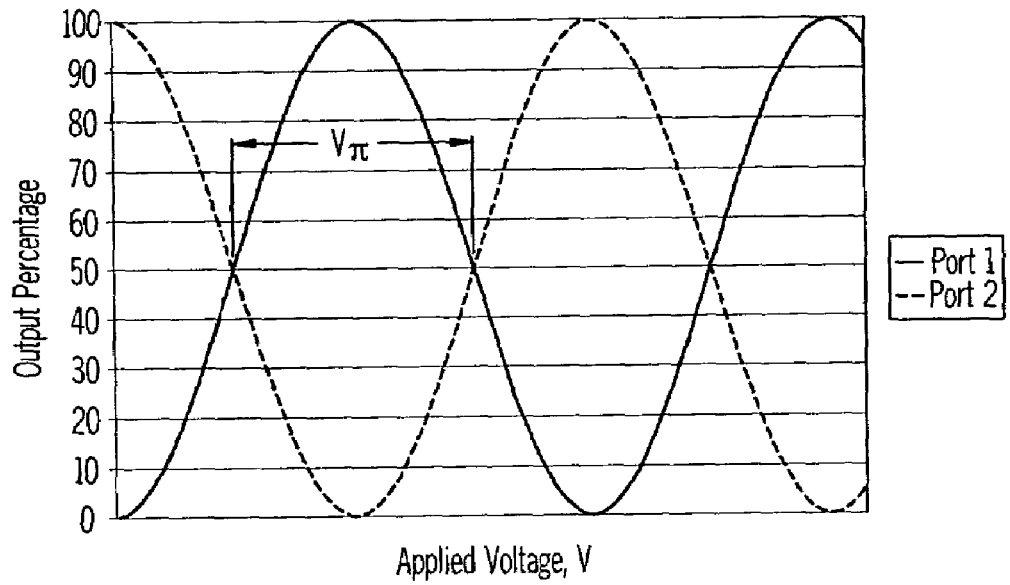
FIGS. 3–5 are graphical illustrations of the manner in which output intensity varies as a function of the magnitude of a control signal applied to a waveguide device according to the present invention.
Figure 4:
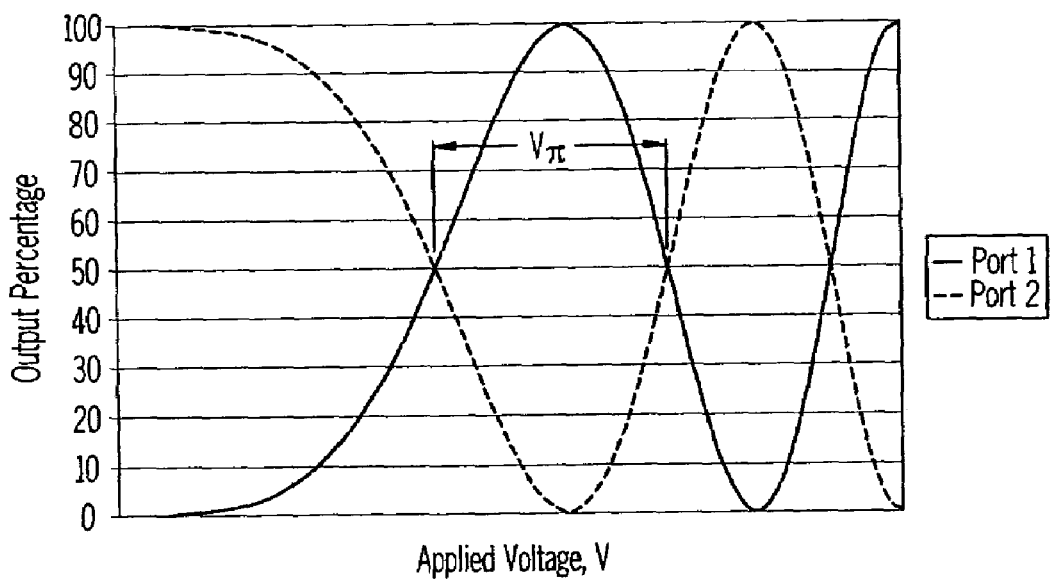

The details by which the variation of the refractive index of the optically functional region 35 of second waveguide arm 15, relative to that of the first waveguide arm 13, create a variation in the output of the modulator 10 are beyond the scope of the present invention and may be readily gleaned from literature describing Mach-Zehnder interferometers and other related devices. Referring to FIGS. 3 and 4, many suitable cladding mediums according to the present invention may be characterized by the manner in which their refractive index changes in relation to the magnitude of the control signal applied thereto. FIG. 3 illustrates the manner in which the respective intensities of output signals at first and second output ports of a two-port Mach Zehnder interferometer vary as a function of the magnitude of a control signal (voltage) applied to the optically functional regions of the interferometer. The response illustrated in FIG. 3 represents the two output channels of a Mach-Zehnder interferometer where the functional cladding responds to a voltage control signal via the Pockels Effect—an electrooptic effect in which the application of an electric field produces a birefringence that is linear in the applied field. The Pockels Effect can only occur in anisotropic mediums. For a functional polymeric cladding, this anisotropy needed for the Pockels Effect is typically introduced through electric field poling of the cladding.

In contrast, un-poled, substantially isotropic polymer claddings are the most suitable for use in accordance with many embodiments of the present invention because they cannot exhibit the Pockels Effect, so the dominant electrooptic response results from the Kerr Effect. The Kerr Effect is defined an electrooptic effect in which the application of an electric field produces a birefringence that varies with a square of the magnitude of the applied field or other control signal. For example, the birefringence illustrated in FIG. 4 results from the use of a polymer in the optically functional region of the interferometer that defines a refractive index approximating a function that varies with a square of the control signal magnitude. More specifically, the function approximated by the refractive index of the cladding medium of the present invention may take the form of the following equation:

$$\Delta n = \lambda K M^2$$

wherein Δn represents a change in refractive index, λ represents the wavelength of light propagating in the cladding, K represents a constant, and M represents the control signal magnitude. In the case of Kerr Effect cladding mediums, K would represent the Kerr constant of the Kerr Effect medium and M would represent the magnitude E of the electric field applied to the medium.

Referring to FIG. 3, application of a control voltage V to the linear electrooptic polymer cladding induces a phase shift Δϕ in the optical signal propagating through the optically functional region. The response is described herein as a "linear" response because, as is clearly illustrated in FIG. 3, successive equal phase shifts Δϕ, for example 180°, are induced by successive equal increases in control voltage V (I≈sin²ϕ, where ϕ=AV). Referring to FIG. 4, application of a control voltage V to an electrooptic polymer cladding according to the present invention also induces successive phase shifts Δϕ in the optical signal but successive phase shifts of equal value are induced with progressively smaller increases in the control voltage V (I≈sin²ϕ, where ϕ=BV²). Thus, in the case of successive phase shifts Δϕ of 180°, the magnitude of the successive control voltage increments $V_\pi$ necessary for inducing the successive 180° phase shifts decreases as the magnitude of the control voltage V increases.

Figure 5:
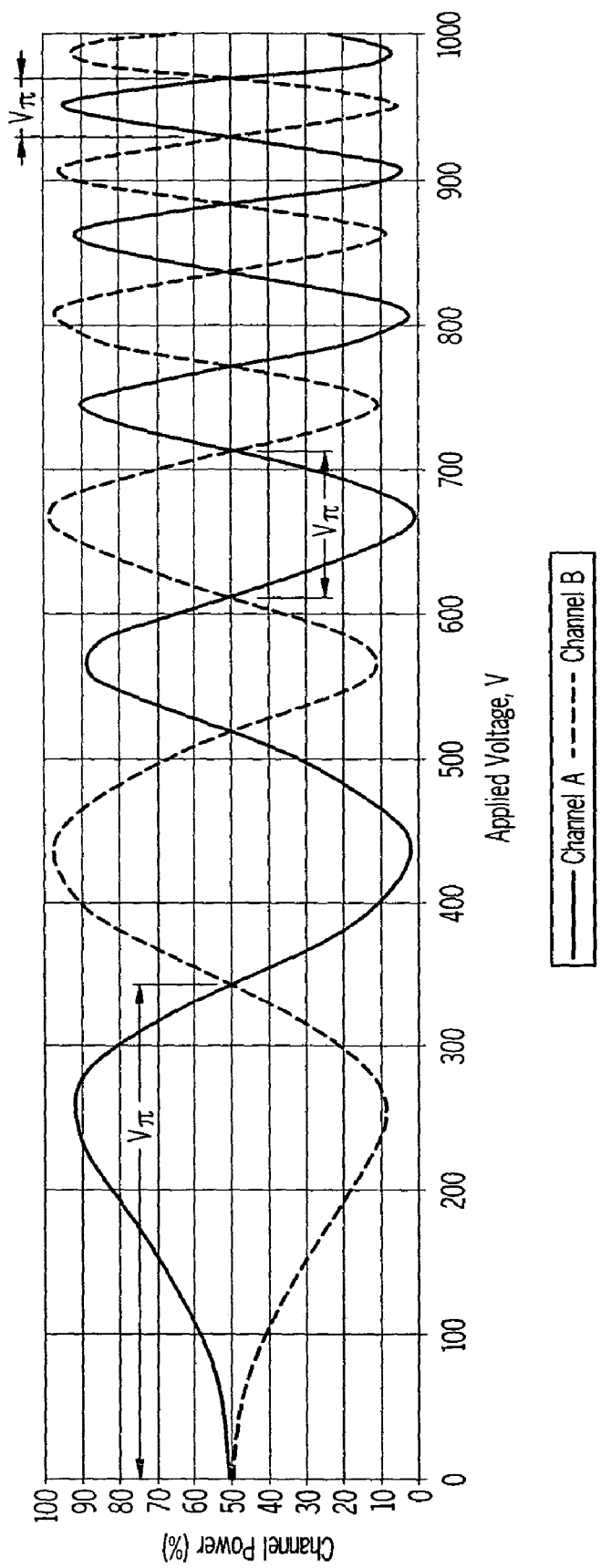

FIG. 5 presents a more detailed illustration of the decrease in the successive control voltage increments $V_\pi$ as the control voltage V increases. Specifically, the graph of FIG. 3 shows that about 340 volts are needed to drive a Mach Zehnder interferometer through a 180° phase shift. The next 180° phase shift occurs at about 520 volts but is achieved by merely increasing the drive voltage by about 180 volts (the difference between 520 volts and 340 volts). A third 180° phase shift occurs at about 610 volts, an increase of merely about 90 volts. Simple extrapolation suggests that, with a bias of about 3000 volts, a $V_\pi$ drive voltage of about 4 volts may be achieved. It is contemplated that improvements in the polymeric cladding medium and refinement of the electrode configuration employed for the control electrodes are likely to yield a device where a 180° phase shift may be achieved with drive voltages of less than 5 volts with a bias voltage of about 1000V.

To explain the operational characteristics illustrated in FIGS. 3–5, we initially note that the phase change induced in a Kerr medium of length L under an applied field E is given by:

$$\Delta\phi = 2\pi K L E^2$$

where K is the Kerr coefficient in mN/V². The field squared term E² shows the quadratic dependence on the field E. In the Kerr effect, the electric field induces optical anisotropy through either molecular reorientation or alteration of the electronic structure of the medium. In the static field limit, the Kerr response of a dilute gas is:

$$[K] = \frac{2\pi N_A}{405}\left[\frac{3}{kT}(\vec{\alpha}:\vec{\alpha} - 3\alpha\alpha) + 2\vec{i}:\vec{\gamma}:\vec{i} + \right.$$

-continued
$$\left. \frac{3}{k^2T^2}(\vec{\alpha}:\vec{\mu}\vec{\mu} - \alpha\mu^2) + \frac{4}{kT}\vec{\mu}\cdot\vec{\beta}:\vec{i}\right]$$

where μ, α, β, γ are the molecular dipole moment, polarizability, and first and second hyperpolarizabilities, respectively. The first two terms are associated with redistribution of the electronic structure of the molecules, while the third and fourth terms involve reorientation of the chromophores. For purely optical fields, only the first and second terms contribute. In the case of small RF fields combined with a large DC bias, the contribution of the third term diminishes as chromophore orientation remains effectively unchanged by the RF oscillations. Based on this discussion, we can expand the field squared term and, omitting the RF squared term because the RF field is much smaller than the bias field, we get $$\Delta\phi = 2\pi K L(E_{DC}^2 + 2E_{DC}E_{RF})$$

where $E_{DC}$ is the DC field produced as a result of applying a bias voltage across the electrode gap and $E_{RF}$ is the electric field produced by the RF modulation signal.

As explained above, the Kerr response for the pure DC field is distinct from that for a combined DC and AC field. We describe this by using two distinct Kerr values for the two frequency regimes, giving the following for the phase change in the waveguide $$\Delta\phi = 2\pi L K_{DC}E_{DC}^2 + 4\pi L K_{RF}E_{DC}E_{RF}$$

It follows that application of a combined DC and RF voltage should lead to a response that has a static component and a component at the same frequency as the RF field. There will also be a component of the response proportional to the square of the RF field. Since the RF field is commonly much smaller than the DC field, this term may be neglected. Examination of the response of the devices has shown this contribution to be smaller than the resolution of the measurements.

Many embodiments of the present invention are likely to benefit from the use of a control signal that comprises a substantially constant DC bias component and a substantially variable RF drive component. The bias component would typically be selected to define a magnitude of the response sufficient to enable substantial control of the refractive index of the optically functional region through variation of the drive component. It is contemplated that in some applications the bias component will be at least an order of magnitude larger than the drive component. In still further applications, particularly those where a modulating output signal is desired, the bias component will comprise a DC voltage and the drive component will comprise an AC drive signal. Regardless of whether a separate bias voltage or biasing control signal is employed as a means of controlling an optically functional region according to the present invention, clear advantages are contemplated in the provision of a controller configured to provide the control signals necessary to operate waveguide devices incorporating the optically functional region.

As is noted above, un-poled, substantially isotropic polymeric cladding mediums are likely to be most suitable for use in accordance with many embodiments of the present invention. However, it is contemplated that poled, substantially anisotropic polymeric cladding mediums exhibiting the Pockels Effect may also be suitable for use in many embodiments of the present invention. For example, in applications where the operating temperature is too low to for the optically functional material to exhibit the Kerr Effect, the material may be poled and operated as a DC bias assisted Pockels device.

Kerr Effect cladding mediums according to the present invention should be able to transition passively from a substantially oriented state to a substantially isotropic state, particularly where their use in an optically functional region involves active transition to a substantially oriented state. As a result, the present invention contemplates cladding mediums comprising a polymer/chromophore blend characterized by a degree of chromophore mobility sufficient to enable the optically functional region to transition passively from a substantially oriented state to a substantially isotropic state, typically in less than about one second, and more preferably in less than one millisecond. In addition, where an un-poled, substantially isotropic, polymeric cladding medium is utilized, the degree of chromophore mobility should also be sufficient to permit transitions from a substantially isotropic state to a substantially oriented state under application of a suitable control signal.

Physical stability of the cladding medium is also likely to be a concern. As a result, it is contemplated that cladding mediums according to the present invention may be provided with acceptable degrees of chromophore mobility and physical stability by either incorporating a plasticizing agent in the cladding medium or ensuring that the effective glass transition temperature of the cladding medium is less than the operating temperature of the device. Cladding mediums characterized by effective glass transition temperatures $T_g$ below about 120° C. and even as low as 20° C. or below are contemplated by the present invention. As will be appreciated by those practicing the present invention, cladding mediums having effective glass transition temperatures $T_g$ in the vicinity of room temperature, below room temperature, or slightly above room temperature (e.g., 25° C.) eliminate many design constraints associated with maintaining a waveguide device at high temperatures (i.e., temperatures above 100° C.).

It is also contemplated that cladding mediums according to the present invention may be provided with acceptable degrees of chromophore mobility by providing a suitable solvent in the cladding medium. In the case of a polymeric cladding medium including a chromophore and a base polymer, suitable solvents will dissolve both the chromophore and the polymer. In many cases, the use of such solvents will yield suitable device operating temperatures at or near room temperature. For the purposes of defining and describing the present invention, it is noted that reference herein to acceptable degrees of chromophore mobility are made with the implicit assumption that the material will exhibit such mobility within at least a portion of the operational temperature range of the device at issue, unless otherwise noted.

Temperature control may be achieved through use of a device controller that comprises a temperature controller configured to maintain the device at a predetermined operating temperature. For example, where the cladding medium is characterized by a given effective glass transition temperature $T_g$, a temperature controller may be employed to maintain the operating temperature above the effective glass transition temperature $T_g$.

It is noted that the present invention contemplates utilization of any suitable conventional or suitable yet to be developed structure for optical signal splitting or combining. For example, suitable alternative structures for splitting and combining optical signals include 2×2 or 2×2 directional coupling regions, 1×2 Y signal splitters/combiners, 1×2 multimode interference element splitters/combiners, and 2×2 multimode interference element splitters/combiners. The specific design parameters of these structures are beyond the scope of the present invention and may be gleaned from existing or yet to be developed sources.

Suitable Kerr Effect mediums for use in the present invention typically comprise a polymer/chromophore blend or a polymer with the chromophore attached as a side chain. The polymer/chromophore blend may, for example, comprise between about 5% and about 20% chromophore, by weight, although other suitable weight % ranges are likely to also be suitable. By way of illustration and not by limitation, it is noted that the polymer may comprise a fluoropolymer or a polymer selected from polycarbonate, terpolymer, PMMA, and polycyclohexane. In the event a solvent is used to enhance chromophore mobility, suitable solvents include, but are not limited to dioxane, THS, and chloroform.

By way of illustration and not limitation, a class of suitable chromophores for use in the present invention comprises a donor component, a bridge component comprising a conjugated and/or aromatic component, and an acceptor component. The donor component may comprise a relatively strong electron-donating group and the acceptor component may comprise a relatively strong electron accepting group. For the purposes of describing and defining the present invention, it is noted that a donor component comprises a component that is capable of donating electrons, an acceptor component comprises a component that is capable of accepting electrons, and a bridge component couples donor and acceptor components strongly. Preferred chromophores may also be selected by accounting for the degree to which they absorb light at the frequency of the propagating signal, with low levels of absorption preferred.

Again by way of illustration and not limitation, chromophores having the following molecular structures may be suitable for use in accordance with the present invention:

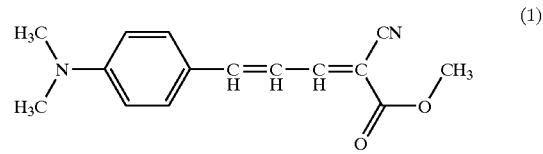
(1)

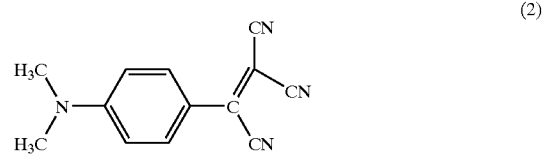
(2)

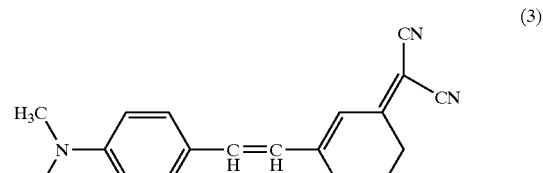
(3)

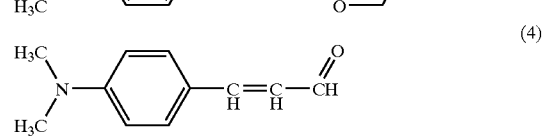
(4)

-continued

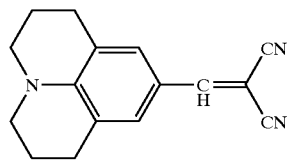
(5)

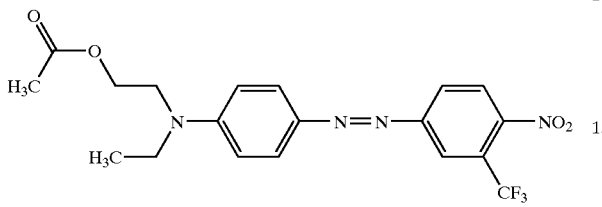
(6)

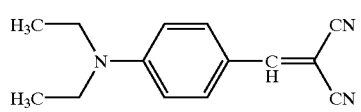
(7)

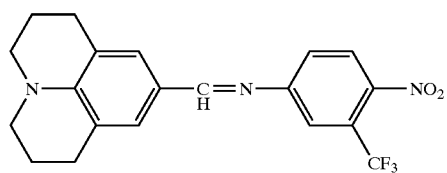
(8)

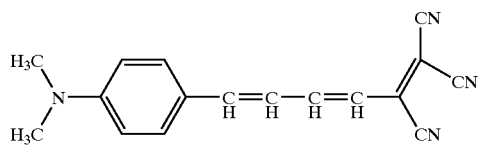
(9)

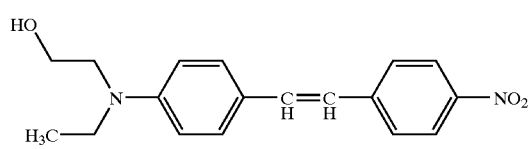
(10)

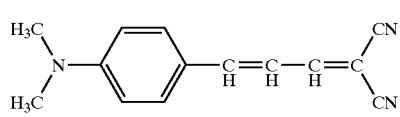
(11)

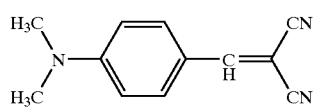
(12)

Suitable operating temperatures of optical waveguide devices according to the present invention are a function of the properties of the optically functional region and the optical waveguide. For example, in embodiments of the present invention where the optically functional region is to define a refractive index that is lower than the refractive index of the optical waveguide, it will be necessary to ensure that the operating temperature of the device is above room temperature if, at room temperature, the refractive index of the optically functional region is above that of the waveguide. Indeed, many functional polymers according to the present invention may be characterized as negative dn/dt polymers in that they define refractive indices that decrease as temperature increases. Thus, a negative dn/dt polymer may have an index of refraction above that of an associated waveguide material at room temperature but below that of the waveguide material at higher temperatures. Of course, it is contemplated that the present invention may utilize positive dn/dt polymers and is not limited to negative dn/dt polymers.

The portion of light allowed to propagate in the optically functional region 35 of the cladding 30 depends upon the degree to which the refractive index of the optically functional region 35 is lower than the refractive index of the optical waveguide 20. It is contemplated that, in most embodiments of the present invention, at least about 10% and no greater than about 90% of the light introduced into the waveguide 20 should be confined within the waveguide 20. More specifically, it is contemplated that in many embodiments of the present invention between about 30% and about 90% of the light introduced into the waveguide 20 will remain confined within the waveguide 20. With further specificity, some contemplated embodiments of the present invention will yield between about 40% and about 60% confinement of the propagating light within the waveguide 20. In terms of refractive index values, the refractive index of the optically functional region in many embodiments of the present invention will be between about 0.3% and about 1.0% lower than the refractive index of the optical waveguide. For example, the refractive index of the optical waveguide may be between about 1.450 and about 1.455 while the refractive index of the optically functional region of the cladding may be between about 1.440 and about 1.450. In one specific embodiment of the present invention, the refractive index of the optical waveguide at 1550 nm is about 1.4542 and the refractive index of the optically functional region of the cladding is about 1.444.

Figure 6:
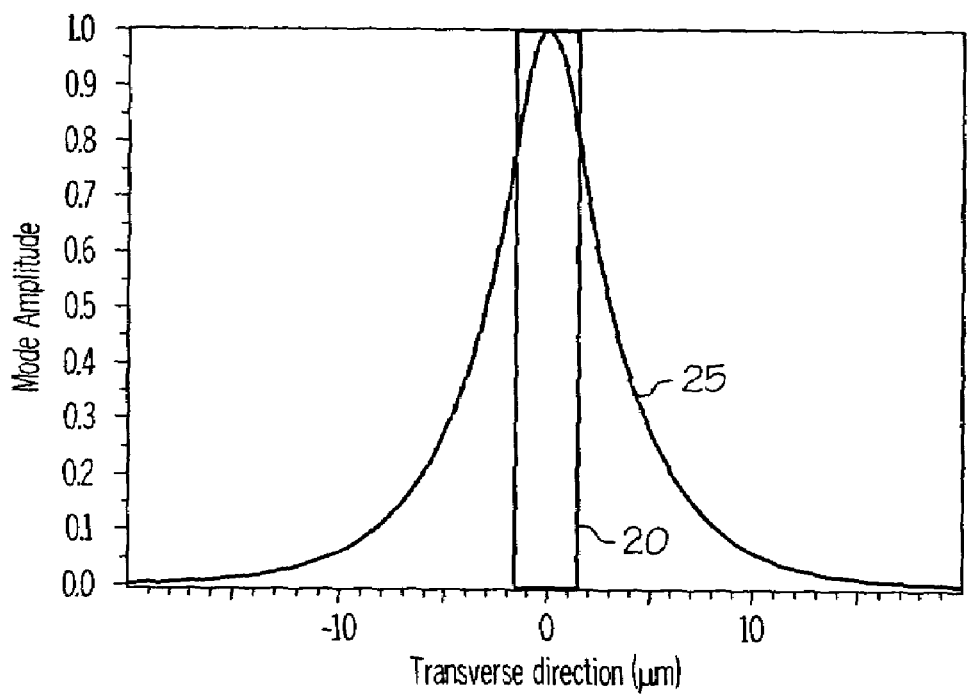
FIGS. 6 and 7 illustrate the intensity distribution of an optical signal, relative to the waveguide dimensions of a waveguide device according to the present invention.
Figure 7:
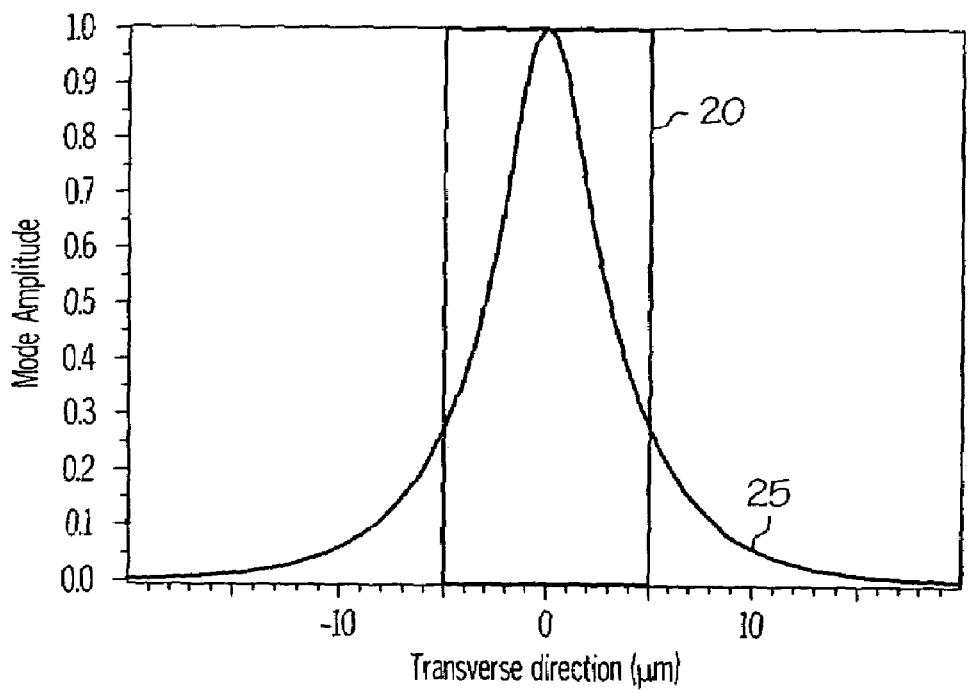

The degree of confinement of propagating light within the waveguide 20 is also a function of the size of the waveguide 20. Specifically, referring to FIGS. 6 and 7, it is contemplated that optical waveguide 20 according to the present invention, illustrated schematically in FIGS. 6 and 7 relative to an intensity profile 25 of a propagating signal, will define cross sectional widths of between about 3 $\mu$m and about 10 $\mu$m. The optical waveguide typically comprises an optically passive material sharing the same portion of the optical axis as the optically functional region of the waveguide device but may alternatively comprise an optically functional portion (e.g., an electrooptic material, a thermooptic material, etc.).

Depending upon the desired operational characteristics of the particular waveguide device according to the present invention, it is contemplated that it may often be advantageous to ensure that the refractive index of the optically functional region is lower than the refractive index of the optical waveguide at temperatures above the effective glass transition temperature of the cladding medium. For the purposes of describing and defining the present invention, it is noted that the effective glass transition temperature of a material is the temperature at which the re-orientational mobility of the chromophore shows a relatively large increase as a function of the temperature of the material. The effective glass transition temperature of an electrooptic material may be determined from measurements of the electrooptic response of the material as a function of its temperature.

Similarly, it is also contemplated that it may often be advantageous to ensure that the refractive index of the optically functional region of the cladding is lower than the refractive index of the optical waveguide at wavelengths between about 1200 nm and about 1650 nm or, more specifically, at a wavelength of about 1300 nm or about 1550 nm. For the purposes of defining and describing the present invention, it is noted that reference to the relative values of the refractive indices of the optically functional region and the optical waveguide are made with the inherent assumption that the relative values are taken at the operational wavelength and temperature of operation of the device, unless otherwise noted.

It is contemplated that the control signal may comprise an optical signal and the optically functional region 35 of the cladding 30 may be responsive to the intensity of the optical signal. Alternatively, the control signal may comprise a thermal signal and the optically functional region 35 of the cladding 30 may be responsive to the magnitude of the thermal signal.

For the purposes of defining and describing the present invention, it is noted that the wavelength of "light" or an "optical signal" is not limited to any particular wavelength or portion of the electromagnetic spectrum. Rather, "light" and "optical signals," which terms are used interchangeably throughout the present specification and are not intended to cover distinct sets of subject matter, are defined herein to cover any wavelength of electromagnetic radiation capable of propagating in an optical waveguide. For example, light or optical signals in the visible and infrared portions of the electromagnetic spectrum are both capable of propagating in an optical waveguide. An optical waveguide may comprise any suitable signal propagating structure. Examples of optical waveguides include, but are not limited to, optical fibers, slab waveguides, and thin-films used, for example, in integrated optical circuits.

The refractive index of the optical waveguide 20 is slightly higher than that of the surrounding cladding 30 at the operational temperature of the device 10. As a result, the electrooptic modulator 10 is well suited for guiding an optical signal. According to one embodiment of the present invention, a doped silica waveguide 20 is envisioned with a refractive index that is 0.7% higher than the cladding 30. This provides good confinement, yet allows some of the light to propagate in the cladding. If the index difference between the waveguide and cladding is reduced to 0.35%, the optical signal will be more loosely confined and more of the light will propagate in the cladding. For a configuration with a passive waveguide and an electrooptic cladding, more efficient electrooptic interaction will occur with the lower index difference. It is further noted that index differences between 0.3% and 1% are better suited for construction of waveguides that are not susceptible to optical losses from slight bends in the waveguide.

Figure 8:
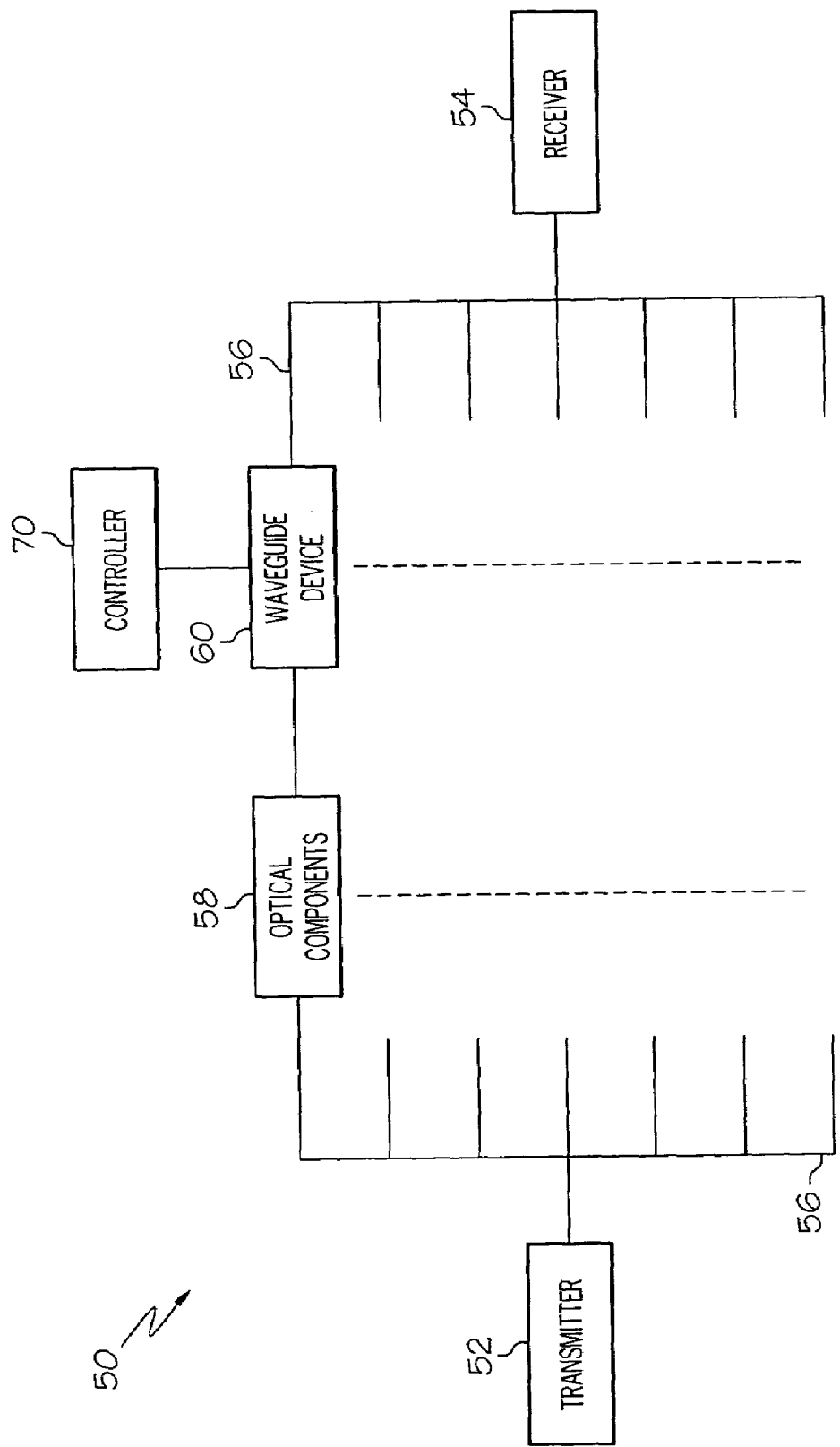
FIG. 8 illustrates an optical network including a waveguide device according to the present invention.

Referring to FIG. 8, it is noted that waveguide devices according to the present invention may be employed in a telecommunications or other type of optical network 50. An optical network 50 according to the present invention may comprise, among other things, one or more transmitters 52 and receivers 54, a network of optical transmission lines 56, a variety of optical components 58, and one or more waveguide devices 60 according to the present invention. The network 50 may further comprise electrical or other non-optical components and transmission lines (not shown). The optical transmitters 52 are configured to transmit optical signals. The variety of optical components commonly utilized in an optical network are illustrated herein with reference to a single block element to preserve clarity of illustration and may include, for example, optical switches, amplifiers, couplers, regenerators, filters, etc.

A controller 70 is provided to enable operation of the waveguide devices 60 on a fully automated basis or in response to an operator command. The controller 70 is configured to establish and control the control signal applied to the optically functional region of each waveguide device 60. The controller may also be utilized to help control the operating temperature or any other operating parameter of the waveguide devices or optical network 50.

Figure 9:
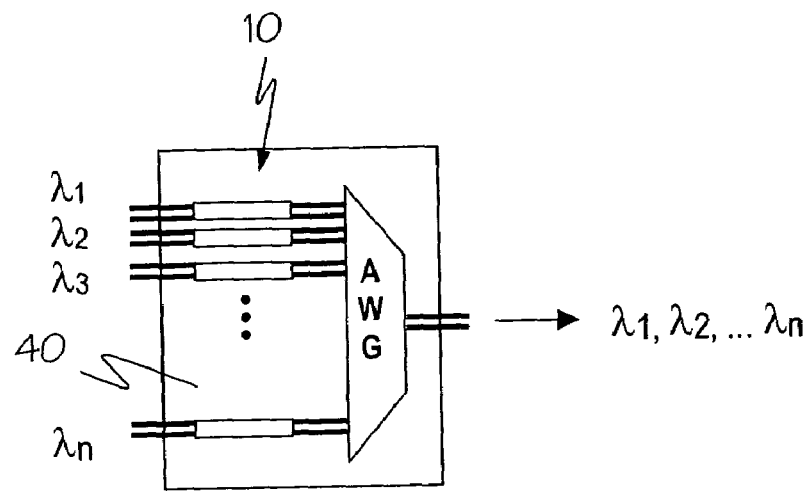
FIG. 9 is a schematic illustration of electrooptic modulators according to the present invention integrated with an input of an arrayed waveguide grating.

Referring to FIG. 9, it is noted that the modulated output of an electrooptic modulator 10 according to the present invention may be integrated with an input of an arrayed waveguide grating (AWG) or another type of wavelength selective device. For the purposes of defining and describing the present invention, it is noted that any structure that either (i) generates a plurality of wavelength discriminated signals from a broadband or multi-wavelength source or (ii) generates a broadband or multi-wavelength source from a plurality of wavelength discriminated signals may be considered a "wavelength selective device." In describing the present invention, reference is consistently made herein to arrayed waveguide gratings as an example of such a device. However, the present invention also contemplates wavelength selective switches, directional couplers, or any other suitable wavelength selective devices.

Figure 10:
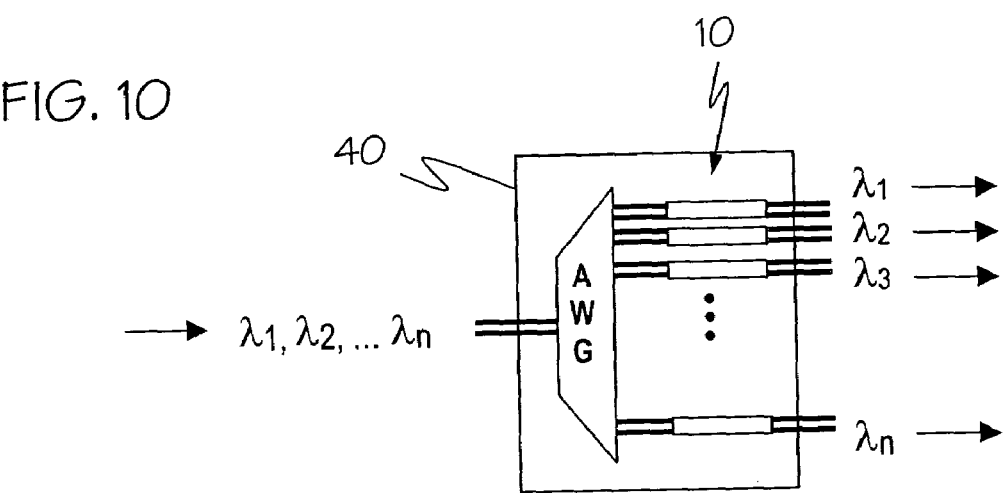
FIG. 10 is a schematic illustration of electrooptic modulators according to the present invention integrated with an output of an arrayed waveguide grating.

In FIG. 9, the arrayed waveguide grating AWG defines a plurality of inputs for n discrete wavelengths $\lambda_1, \lambda_2, \lambda_3 \ldots \lambda_n$. Each of the inputs may be coupled to respective modulated outputs of a set of electrooptic modulators 10 according to the present invention. As will be appreciated by those skilled in the art of optical communications, the arrayed waveguide grating is configured to generate a multiplexed signal $\lambda_1, \lambda_2, \ldots \lambda_n$ from the plurality of modulated outputs of the discrete wavelength signals. In FIG. 10, the arrayed waveguide grating AWG defines a single input coupled to a broadband or multi-spectral source $\lambda_1, \lambda_2, \ldots \lambda_n$ and the electrooptic modulators 10 are integrated with respective outputs of the arrayed waveguide grating (AWG) to modulate the demultiplexed signals $\lambda_1, \lambda_2, \lambda_3 \ldots \lambda_n$. As is illustrated schematically in FIGS. 9 and 10, the arrayed waveguide grating AWG and the plurality of modulators 10 may be formed on, layered upon, supported by, or otherwise configured on a common substrate 40.

Figure 11:
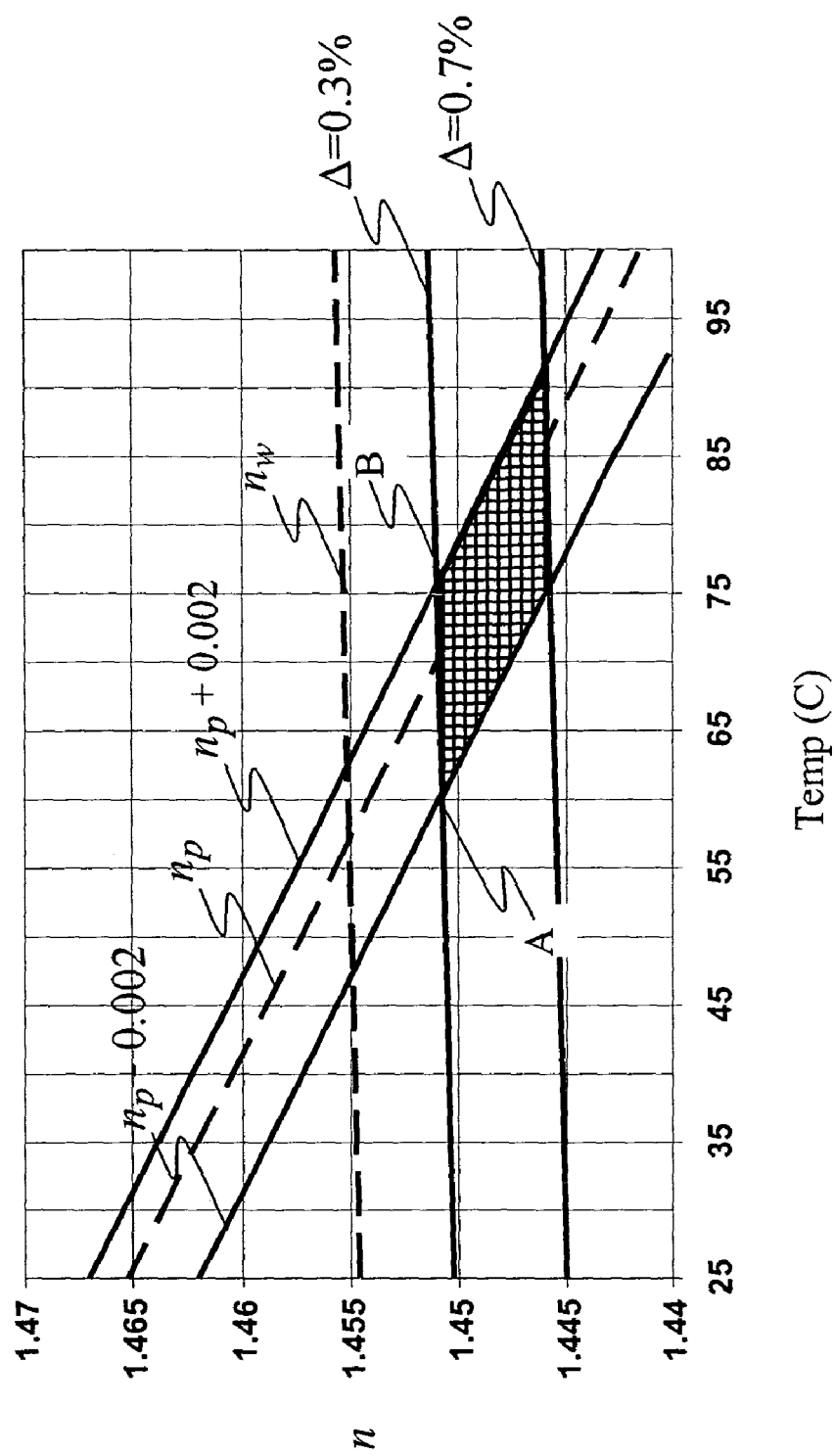
FIG. 11 is a graphical illustration of the manner in which the properties of optically functional regions according to the present invention and the operational parameters of devices employing the regions may be optimized.

It is noted that the properties of optically functional regions according to the present invention and the operational parameters of devices employing the regions may be optimized as illustrated in FIG. 11, where $n_p$ denotes the index of refraction of the polymer of the optically functional region, $n_w$ denotes the index of refraction of the waveguide, and $$\Delta = \frac{n_w - n_p}{n_w}.$$

Specifically, in many instances, it will be preferable to provide waveguide devices according to the present invention with some type of operational temperature controller configured to optimize the operating temperature of the optically functional cladding region. In these cases, the controller may be programmed to maintain the operating temperature at a value sufficient to yield an optically functional region refractive index $n_p$ of at least about 0.3% lower than a refractive index $n_w$ of the optical waveguide. In the illustrated embodiment, accounting for some uncertainty in the value of the refractive index $n_p$, this temperature value would be between about 60° C. and about 75° C., corresponding to the line segment extending from point A to point B in FIG. 11. Stated more generally, operating temperatures corresponding to any point within the cross hatched area of FIG. 11 (e.g., between about 60° C. and about 90° C.) are suitable candidates where the refractive index $n_p$ is to be between about 0.3% and about 0.7% lower than a refractive index $n_w$.

As is further illustrated in FIG. 11, optically functional cladding regions according to the present invention may comprises a negative dn/dt polymer, i.e., a polymer that defines a refractive index $n_p$ that decreases as temperature increases. In contrast, the associated optical waveguide may comprise a positive dn/dt material, i.e., a material that defines a refractive index $n_p$ that increases as temperature increases. In FIG. 11, the optically functional region refractive index $n_p$ decreases under increasing temperature at a rate sufficient to yield an refractive index $n_p$ between about 0.3% and about 1.0% lower than a refractive index $n_w$ of the optical waveguide. The refractive index $n_p$ is at least about 0.3% lower than the refractive index $n_w$ at a temperature of between about 60° C. and about 90° C.

Figure 12:
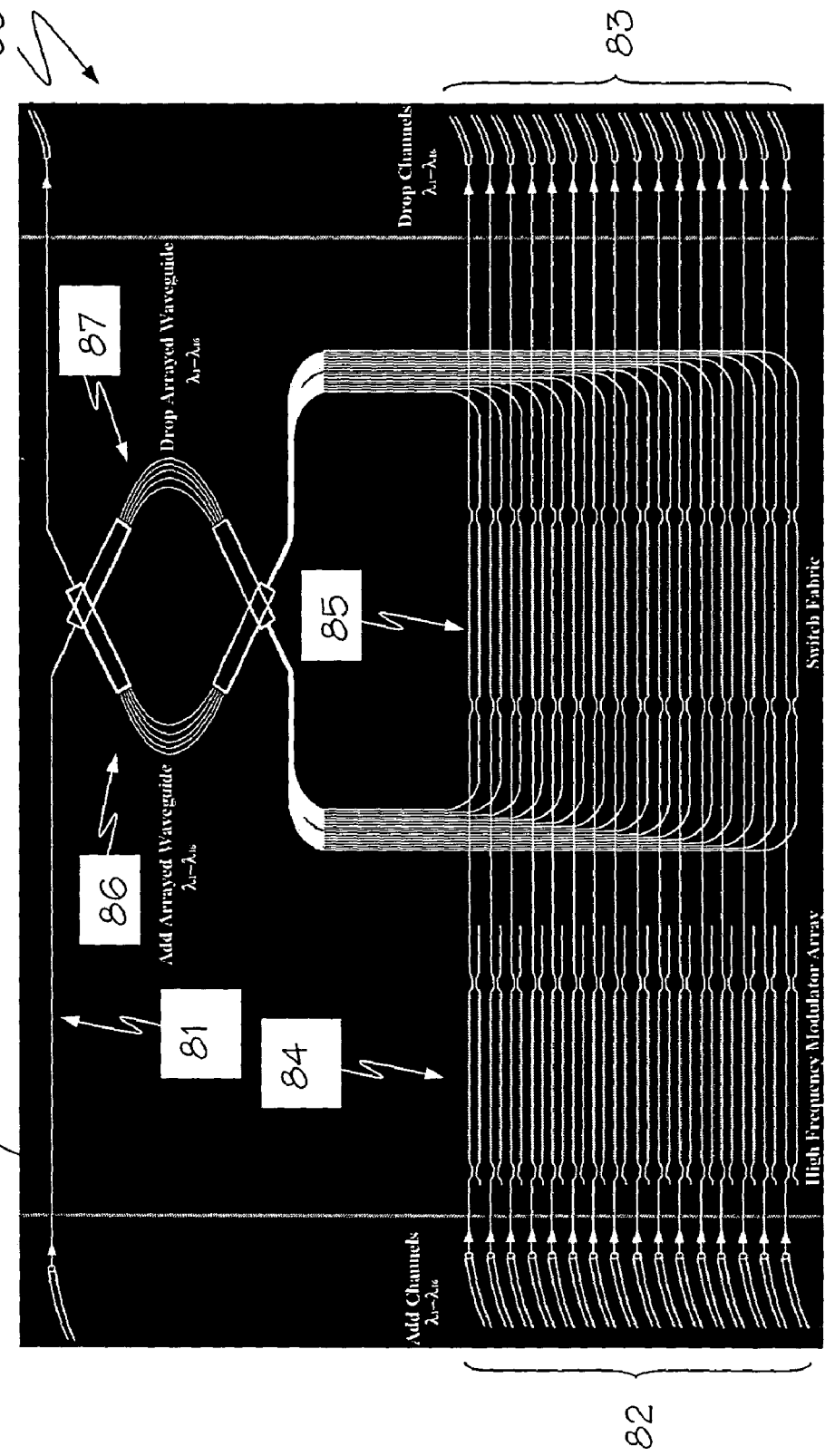
FIG. 12 is a schematic illustration of an integrated optical device according to the present invention.

Referring now to FIG. 12, an integrated optical device 80 according to the present invention is illustrated and comprises an optical transmission line 81, a plurality of add channels 82 and drop channels 83, an array of electrooptic modulators 84, an array of electrooptic switches 85, an "add" arrayed waveguide grating 86, and a "drop" arrayed waveguide grating 87. The optical transmission line 81 is configured to carry a plurality of optical signals $\lambda_1, \lambda_2, \lambda_n$. The plurality of add channels 82 are coupled to the optical transmission line 81 via the array of electrooptic modulators 84, the array of electrooptic switches 85, and the "add" arrayed waveguide grating 86. The plurality of drop channels 83 are coupled to the optical transmission line 81 via the array of electrooptic switches 85 and the "drop" arrayed waveguide grating 87. The array of electrooptic switches 85 are configured to drop from the optical transmission line 81 signal(s) of a selected wavelength $\lambda_i$ while adding to the optical transmission line 81 a corresponding signal of the selected wavelength $\lambda_i$ from one of the electrooptic modulators 84.

Electrooptic modulators 84 according to the present invention enable the configuration of the optical transmission line 81, the plurality of add and drop channels 82, 83 the array of electrooptic modulators 84, the array of electrooptic switches 85, the "add" arrayed waveguide grating 86, and the "drop" arrayed waveguide grating 87 on a common substrate 88. It is contemplated that these elements may be configured on the substrate 88 in any one of a variety of suitable manners including, but not limited to, formation in or on the substrate, layering over the substrate, supporting on the substrate, etc. Further, electrooptic modulators 84 according to the present invention may be utilized in a variety of applications as a cost effective integrated component of a telecommunications network.

Figure 13:
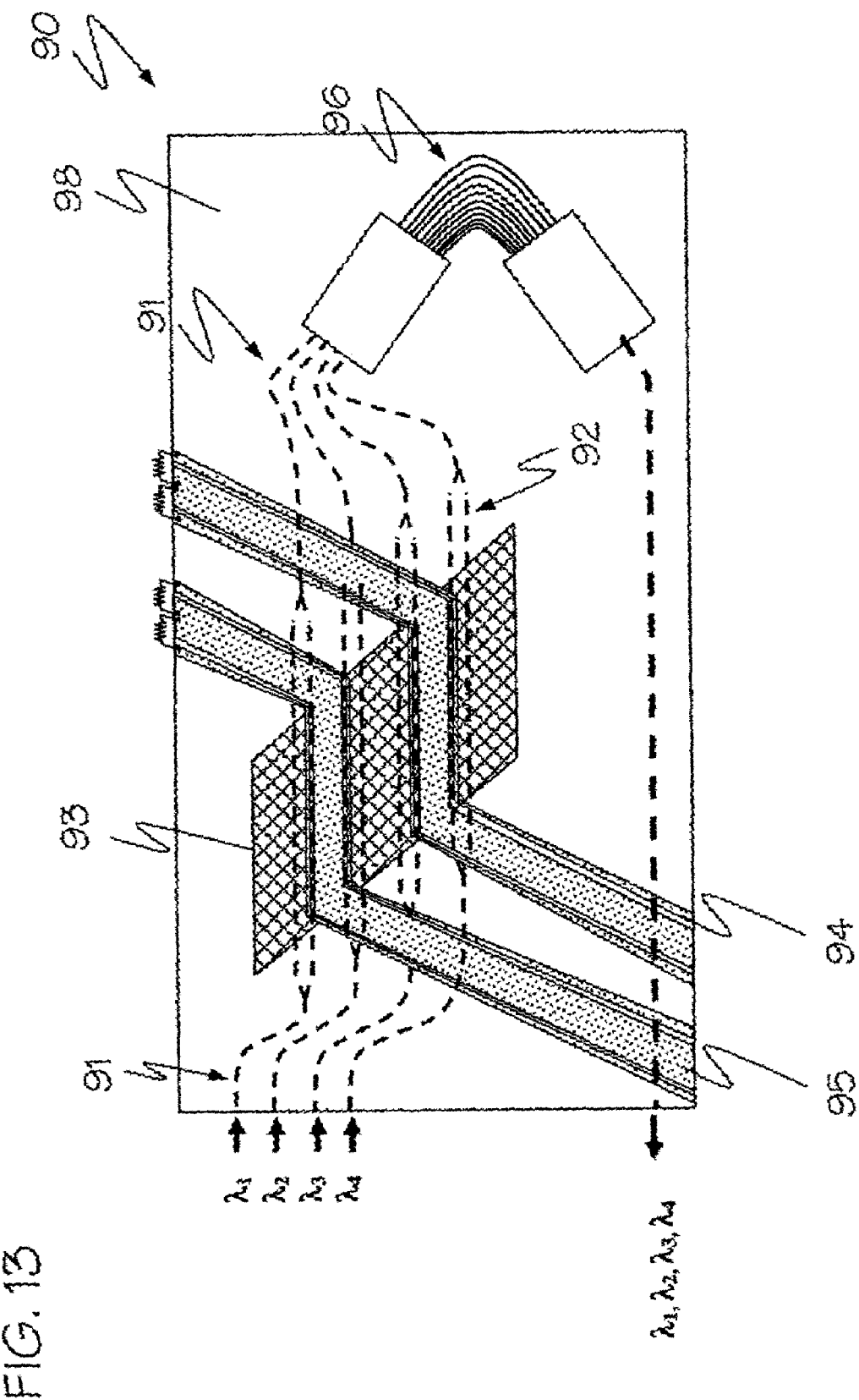
FIGS. 13 and 14 are schematic illustrations of integrated electrooptic modulator arrays according to the present invention.

Referring to FIG. 13, an electrooptic modulator array 90 according to the present invention is illustrated. The modulator array 90 comprises an array of optical waveguides 91, respective pairs of optical waveguide arms 92, an optically functional cladding region 93, and a modulation controller comprising an array of signal electrodes 94 and shared ground electrodes 95. The array of optical waveguides 91 is configured to split a propagating optical signal into the respective pairs of optical waveguide arms 92 and recombine the optical signals after passage through the optically functional cladding region 93. The optically functional cladding region 93 is configured such that at least one of the optical waveguide arms of each pair of optical waveguide arms 92 passes through the functional cladding before the arm pairs 92 are recombined.

The modulation controller is configured to provide a modulating control signal to the optically functional cladding region 93 and comprises an array of signal electrodes 94 dedicated to individual ones of the optical waveguide arms passing through the optically functional region 93. The signal and the ground electrodes 94, 95 are configured to generate respective electric fields in the optically functional cladding region 93 in response to respective control signals applied to different ones of the signal electrodes 94. As is discussed above, the optically functional cladding region 93 defines a refractive index that is configured to vary in response to the applied field. In this manner, the respective electric fields generated in the optically functional cladding region alter the respective refractive indices associated with individual ones of the optical waveguide arms passing through the optically functional region 93.

Figure 14:
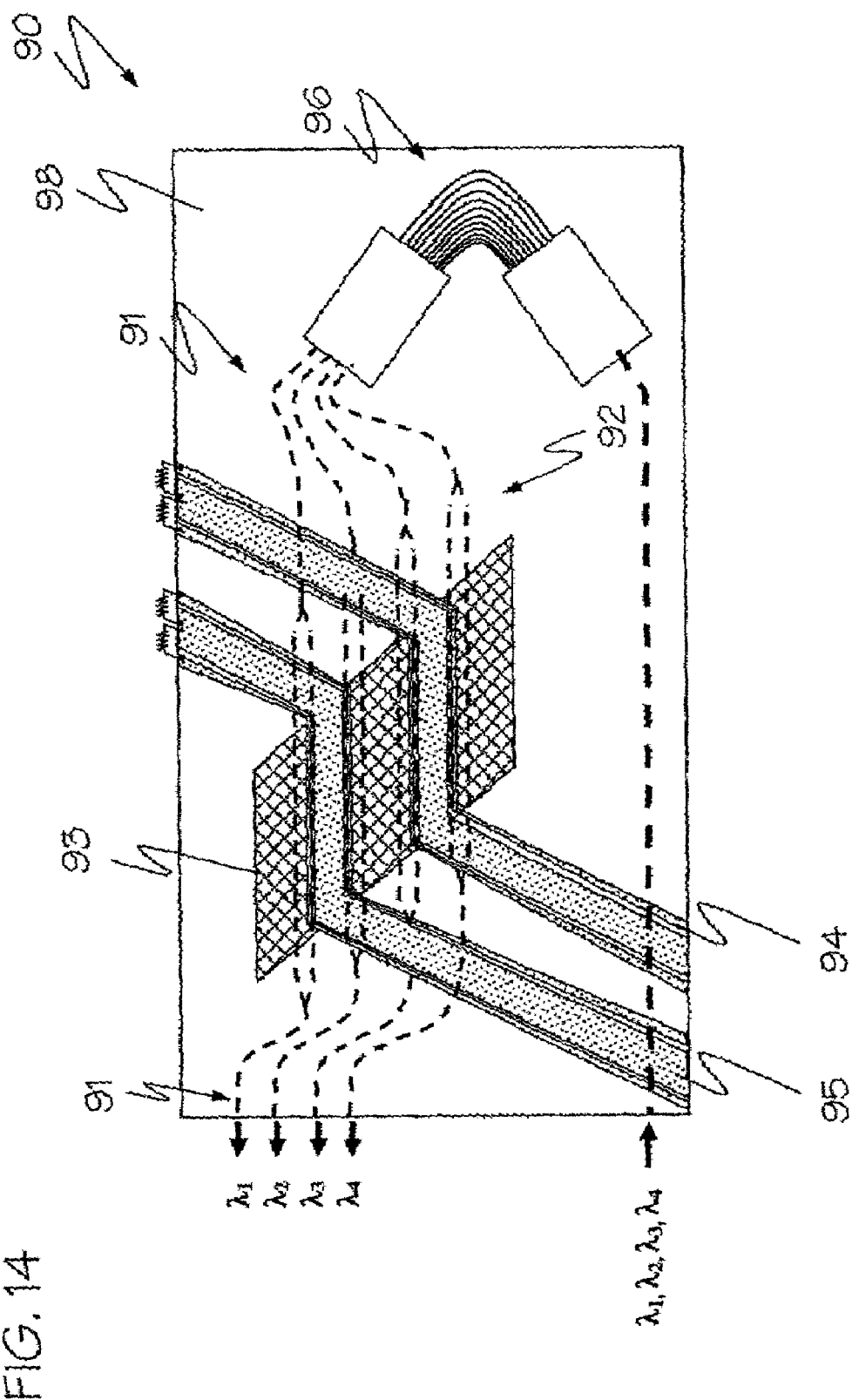

As is illustrated in FIG. 13, the electrooptic modulator array 90 further comprises an arrayed waveguide grating 96 configured to multiplex the respective signals propagating along the array of optical waveguides 91, as modulated by the modulation controller. Alternatively, as is illustrated in FIG. 14, the arrayed waveguide grating may be configured to demultiplex an input signal and direct respective demultiplexed signals to propagate along individual ones of the array of optical waveguides 91, for modulation by the modulation controller. The array of optical waveguides 91, the optically functional cladding region 93, the signal and the ground electrodes 94, 95, and the arrayed waveguide grating 96 may be configured on a common substrate 98.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. For example, several embodiments of the present invention described herein are directed to affecting refractive index using functional electrooptic claddings. However, it is contemplated that many of the embodiments described herein are also applicable for functional electrooptic waveguides—with or without functional claddings.

What is claimed is:

1. An electrooptic modulator comprising an optical waveguide, a cladding optically coupled to said optical waveguide, an optically functional cladding region defined in at least a portion of said cladding, and a modulation controller configured to provide a modulating control signal to said optically functional cladding region, wherein:

said optically functional cladding region defines a refractive index that is configured to vary in response to said modulating control signal;

said refractive index of said optically functional cladding region is lower than a refractive index of said optical waveguide at an operational wavelength and an operational temperature of said device;

said optical waveguide is configured to split a propagating optical signal into first and second optical waveguide arms;

at least said second optical waveguide arm passes through said optically functional region;

said optical waveguide is configured to recombine respective propagating optical signals from said first and second optical waveguide arms after at least one of said signals passes through said optically functional region;

said modulation controller is configured to generate an electric field in a portion of said optically functional region associated with said second optical waveguide arm through application of a biased modulating RF control signal that comprises a bias component and a variable drive component;

said bias component of said biased modulating RF control signal defines a magnitude that is at least an order of magnitude large than said drive component; and a magnitude and orientation of said electric field in said optically functional region of said second optical waveguide arm is sufficient to alter the refractive index of said optically functional region of said second optical waveguide arm.

2. An electrooptic modulator as claimed in claim 1 wherein said modulation controller comprises a signal electrode and a ground electrode.

3. An electrooptic modulator as claimed in claim 2 wherein:

said signal electrode and said ground electrode are configured as a traveling wave electrode structure defining a traveling wave electrode gap; and said second optical waveguide arm passes through said optically functional region in substantial alignment with said traveling wave electrode gap.

4. An electrooptic modulator as claimed in claim 2 wherein:

said signal electrode and said ground electrode are configured as a traveling wave electrode structure defining a control signal input terminal and a control signal termination; and said modulation controller is configured to isolate said control signal input terminal and said control signal termination from a DC bias voltage in said signal electrode.

5. An electrooptic modulator as claimed in claim 2 wherein:

said signal electrode and said ground electrode are configured as a traveling wave electrode structure defining a control signal input terminal and a control signal termination; and said modulation controller comprises a first blocking capacitor configured to isolate said control signal input terminal from a DC bias voltage in said signal electrode and a second blocking capacitor configured to isolate said control signal termination from DC bias voltage in said signal electrode.

6. An electrooptic modulator as claimed in claim 3 wherein:

said signal electrode and said ground electrode are configured as a traveling wave electrode structure defining a control signal input terminal and a control signal termination; and said modulation controller comprises a blocking capacitor configured to isolate said control signal input terminal from a DC bias voltage in said signal electrode.

7. An electrooptic modulator as claimed in claim 3 wherein:

said signal electrode and said ground electrode are configured as a traveling wave electrode structure defining a control signal input terminal and a control signal termination; and said modulation controller comprises a blocking capacitor configured to isolate said control signal termination from a DC bias voltage in said signal electrode.

8. An electrooptic modulator as claimed in claim 2 wherein said modulation controller comprises a bias voltage source configured to provide a bias voltage to said signal electrode.

9. An electrooptic modulator as claimed in claim 8 wherein said bias voltage source is configured to provide a bias voltage magnitude sufficient to enable substantial control of said refractive index of said optically functional region through modulation of said RF control signal.

10. An electrooptic modulator as claimed in claim 8 wherein said modulation controller, said optically functional region, and said second optical waveguide arm are configured such that a phase change $\Delta\phi$ in said second optical waveguide arm is proportional to:

$$AE_{DC}^2 + BE_{DC}E_{RF}$$

where A and B are constants and $E_{DC}$ and $E_{RF}$ correspond to the respective magnitudes of DC and RF components of said control signal.

11. An electrooptic modulator as claimed in claim 1 wherein said optically functional region is defined by a polymeric cladding medium comprising a polymer/chromophore blend or a polymer with a chromophore attached as a side chain.

12. An electrooptic modulator as claimed in claim 11 wherein said polymeric cladding medium is characterized by a predetermined degree of chromophore mobility sufficient to enable transition of said optically functional region between a substantially oriented state and a substantially isotropic state at a frequency of said control signal.

13. An electrooptic modulator as claimed in claim 11 wherein said polymeric cladding medium is characterized by a predetermined degree of chromophore mobility sufficient to enable transition of said optically functional region between a substantially oriented state and a substantially isotropic state in less than about one second.

14. An electrooptic modulator as claimed in claim 11 wherein said polymeric cladding medium is characterized by a predetermined degree of chromophore mobility sufficient to enable transition of said optically functional region between a substantially oriented state and a substantially isotropic state in less than about 1 ms.

15. An electrooptic modulator as claimed in claim 11 wherein said polymeric cladding medium is characterized by a predetermined degree of chromophore mobility sufficient to permit transition of said optically functional region between a substantially oriented state and a substantially isotropic state at a frequency in excess of 1 GHz.

16. An electrooptic modulator as claimed in claim 11 wherein said polymeric cladding medium is characterized by a predetermined degree of chromophore mobility sufficient to permit transition of said optically functional region between a substantially oriented state and a substantially isotropic state at a frequency of said RF signal.

17. An electrooptic modulator as claimed in claim 1 wherein said optically functional cladding region is characterized by an orientational mobility sufficient to enable transition between a substantially oriented state and a substantially isotropic state at a frequency of said RF control signal.

18. An electrooptic modulator as claimed in claim 1 wherein said optically functional region of said cladding comprises a Kerr Effect medium.

19. An electrooptic modulator as claimed in claim 1 wherein said optically functional region of said cladding comprises a Pockels Effect medium.

20. An electrooptic modulator as claimed in claim 1 wherein said optically functional region of said cladding defines a refractive index approximating a function that varies with a square of a magnitude of said control signal.

21. An electrooptic modulator as claimed in claim 20 wherein said function approximated by said refractive index of said optically functional cladding comprises:

$$\Delta n = \lambda K M^2$$

wherein $\Delta n$ represents a change in refractive index, $\lambda$ represents the wavelength of light propagating in said cladding, K represents a constant, and M represents said control signal magnitude.

22. An electrooptic modulator as claimed in claim 11 wherein said cladding medium comprises a Kerr Effect medium and K represents the Kerr constant of said Kerr Effect medium.

23. An electrooptic modulator as claimed in claim 21 wherein said control signal comprises an electric field and M represents an intensity E of said electric field.

24. An electrooptic modulator as claimed in claim 1 wherein:
said optically functional region of said cladding comprises a cladding medium configured to induce a phase shift $\Delta \phi$ in an optical signal propagating through said optically functional region in response to a control voltage V applied to said optically functional region; and
said cladding medium is configured such that successive phase shifts $\Delta \phi$ of 180° are induced in said optical signal as a magnitude of said control voltage is increased in successive increments $V_\pi$ and such that said successive increments $V_\pi$ decrease in magnitude as said magnitude of said control voltage is increased.

25. An electrooptic modulator as claimed in claim 24 wherein said successive increments $V_\pi$ decrease according to a quadratic relationship with said control voltage.

26. An electrooptic modulator as claimed in claim 1 wherein said optically functional region of said cladding comprises an un-poled, substantially isotropic polymeric cladding medium.

27. An electrooptic modulator as claimed in claim 1 wherein said optically functional region of said cladding comprises a poled, substantially anisotropic polymeric cladding medium.

28. An electrooptic modulator as claimed in claim 1 wherein said waveguide device further comprises a controller configured to control an operating temperature of said optically functional cladding region.

29. An electrooptic modulator as claimed in claim 28 wherein said controller is programmed to maintain said operating temperature at a value sufficient to yield an optically functional region refractive index $n_p$ of at least about 0.3% lower than a refractive index $n_w$ of said optical waveguide.

30. An electrooptic modulator as claimed in claim 28 wherein said controller is programmed to maintain said operating temperature at a value sufficient to yield an optically functional region refractive index $n_p$ between about 0.3% and about 1.0% lower than a refractive index $n_w$ of said optical waveguide.

31. An electrooptic modulator as claimed in claim 1 wherein said optically functional cladding region comprises a negative dn/dt polymer defining a refractive index $n_p$ that decreases as temperature increases.

32. An electrooptic modulator as claimed in claim 31 wherein said optical waveguide comprises a positive dn/dt polymer defining a refractive index $n_p$ that increases as temperature increases.

33. An electrooptic modulator as claimed in claim 31 wherein said optically functional region refractive index $n_p$ decreases under increasing temperature at a rate sufficient to yield an refractive index $n_p$ between about 0.3% and about 1.0% lower than a refractive index $n_w$ of said optical waveguide.

34. An electrooptic modulator as claimed in claim 33 wherein said refractive index $n_p$ is at least about 0.3% lower than said refractive index $\rho_w$ at a temperature of between about 60° C. and about 90° C.

35. An electrooptic modulator as claimed in claim 33 wherein said refractive index $n_p$ is between about 0.3% and about 1.0% lower than said refractive index $n_w$ at a temperature of between about 60° C. and about 90° C.

36. An electrooptic modulator as claimed in claim 1 wherein:
said optically functional cladding region and said waveguide are positioned between upper and lower support layers;
said signal electrode and said ground electrode are positioned in a common plane substantially parallel to one of said support layers;
said signal electrode and said ground electrode are separated by a widthwise gap g in said common plane;
said waveguide extends along a plane parallel to said common plane and said parallel plane is offset from said common plane by a distance h;
said signal electrode defines a widthwise dimension W in said common plane; and
said ground electrode defines a widthwise dimension S in said common plane.

37. An electrooptic modulator as claimed in claim 1 wherein said waveguide, said signal electrode, and said ground electrode are configured to achieve about 50 ohms of impedance across said signal electrode and said ground electrode.

38. An electrooptic modulator as claimed in claim 1 wherein said waveguide, said signal electrode, and said ground electrode are configured such that:
said widthwise gap g is between about 2 $\mu$m and about 50 $\mu$m;
said distance h is between about 0 and about 50 $\mu$m;
said widthwise dimension W is between about 5 $\mu$m and about 500 $\mu$m; and
said widthwise dimension S is between about 5 $\mu$m and about 2000 $\mu$m.

39. An electrooptic modulator as claimed in claim 1 wherein said waveguide, said signal electrode, and said ground electrode are configured such that:
   said widthwise gap g is between about 10 μm and about 500 μm;
   said distance h is about zero;
   said widthwise dimension W is between about 5 μm and about 500 μm; and
   said widthwise dimension S is between about 5 μm and about 2000 μm.

40. An electrooptic modulator as claimed in claim 1 wherein said waveguide, said signal electrode, and said ground electrode are configured such that:
   said widthwise gap g is between about 10 μm and about 20 μm;
   said distance h is between about 5 μm and about 11 μm;
   said widthwise dimension W is between about 10 μm and about 200 μm; and
   said widthwise dimension S is between about 10 μm and about 500 μm.

41. An electrooptic modulator as claimed in claim 1 wherein said waveguide, said signal electrode, and said ground electrode are configured such that:
   said widthwise gap g is between about 15 μm and about 40 μm;
   said distance h is about zero;
   said widthwise dimension W is between about 10 μm and about 200 μm; and
   said widthwise dimension S is between about 10 and about 300 μm.

42. An electrooptic modulator as claimed in claim 1 wherein:
   said optically functional cladding region and said waveguide are positioned between upper and lower support layers; and
   said signal electrode is positioned against one of said upper and lower support layers and said ground electrode is positioned against the other of said upper and lower support layers.

43. An electrooptic modulator as claimed in claim 37 wherein said waveguide is spaced from said upper and lower support layers by a spacer layer.

44. An electrooptic modulator as claimed in claim 1 wherein:
   a modulated output of said electrooptic modulator is integrated with an input of a wavelength selective device;
   said wavelength selective device defines a plurality of inputs, each coupled to additional modulated outputs of additional electrooptic modulators; and
   said wavelength selective device is configured to generate a multiplexed signal from said plurality of modulated outputs.

45. An electrooptic modulator as claimed in claim 44 wherein said wavelength selective device and said plurality of modulators are configured on a common substrate.

46. An electrooptic modulator as claimed in claim 44 wherein said wavelength selective device comprises an arrayed waveguide grating.

47. An electrooptic modulator as claimed in claim 1 wherein:
   an input of said electrooptic modulator is integrated with an demultiplexed output of a wavelength selective device;
   said wavelength selective device defines a plurality of demultiplexed outputs, each coupled to additional inputs of additional electrooptic modulators; and
   said wavelength selective device is configured to generate said demultiplexed outputs from a multiplexed signal.

48. An electrooptic modulator as claimed in claim 47 wherein said wavelength selective device and said plurality of modulators are configured on a common substrate.

49. An electrooptic modulator as claimed in claim 1 wherein:
   an input of said electrooptic modulator is integrated with a $\lambda_1$ add channel of an optical network;
   a modulated output of said electrooptic modulator is integrated with a $\lambda_1$ optical transmission line via an electrooptic switch and a $\lambda_1$ add line of an "add" wavelength selective device;
   said $\lambda_1$ optical transmission line is integrated with a $\lambda_1$ drop channel of said optical network via a $\lambda_1$ drop line of a "drop" wavelength selective device and said electrooptic switch.

50. An electrooptic modulator as claimed in claim 49 wherein:
   additional inputs of additional electrooptic modulators are integrated with additional $\lambda_i$ add channels of an optical network;
   additional modulated outputs of said electrooptic modulators are integrated with a respective $\lambda_n$ optical transmission lines via additional electrooptic switches and additional $\lambda_n$ add lines of said "add" wavelength selective devices;
   said additional $\lambda_n$ optical transmission lines are integrated with additional $\lambda_n$ drop channels of said optical network via additional $\lambda_n$ drop lines of said "drop" wavelength selective device and said additional electrooptic switches.

51. An electrooptic modulator as claimed in claim 50 wherein said electrooptic modulators, said "add" wavelength selective device, said "drop" wavelength selective device, said transmission line, and said electrooptic switches are configured on a common substrate.

52. An electrooptic modulator as claimed in claim 1 wherein said modulation controller comprises a signal electrode and a ground electrode and is further configured to isolate a DC voltage bias generated in said signal electrode from a control signal input and a control signal termination of said signal electrode.

53. An electrooptic modulator comprising an optical waveguide, a cladding optically coupled to said optical waveguide, an optically functional cladding region defined in at least a portion of said cladding, and a modulation controller configured to provide a modulation control signal to said optically functional polymeric cladding region, wherein:
   said optically functional polymeric cladding region comprises a polymer/chromophore blend or a polymer with a chromophore attached as a side chain and is characterized by a degree of chromophore mobility sufficient to enable transition of said optically functional region between a substantially oriented state and a substantially isotropic state at a frequency in excess of about 1 GHz;
   said refractive index of said optically functional cladding region is lower than a refractive index of said optical waveguide at an operational wavelength and an operational temperature of said device;
   said optical waveguide is configured to split a propagating optical signal into first and second optical waveguide arms;

at least said second optical waveguide arm passes through said optically functional region;

said optical waveguide is configured to recombine respective propagating optical signals from said first and second optical waveguide arms after at least one of said signals passes through said optically functional region;

said modulation controller is configured to generate an electric field in a portion of said optically functional region associated with said second optical waveguide arm through application of a biased modulating RF control signal that comprises a bias component and a variable drive component; and a magnitude and orientation of said electric field in said optically functional region of said second optical waveguide arm is sufficient to alter the refractive index of said optical functional region of said second optical waveguide arm.

54. An electrooptic modulator comprising an optical waveguide, a cladding optically coupled to said optical waveguide, an optically functional cladding region defined in at least a portion of said cladding, and a modulation controller configured to provide a modulating control signal to said optically functional cladding region, wherein:

said optically functional region of said cladding defines a refractive index approximating a function that varies with a square of a magnitude of said control signal;

said refractive index of said optically functional cladding region is lower than a refractive index of said optical waveguide at an operational wavelength and an operational temperature of said device;

said optical waveguide is configured to split a propagating optical signal into first and second optical waveguide arms;

at least said second optical waveguide arm passes through said optically functional region;

said optical waveguide is configured to recombine respective propagating optical signals from said first and second optical waveguide arms after at least one of said signals passes through said optically functional region;

said modulation controller is configured to generate an electric field in a portion of said optically functional region associated with said second optical waveguide arm through application of a biased modulating RF control signal that comprises a bias component and a variable drive component; and a magnitude and orientation of said electric field in said optically functional region of said second optical waveguide arm is sufficient to alter the refractive index of said optically functional region of said second optical waveguide arm.

55. An electrooptic modulator comprising an optical waveguide, a cladding optically coupled to said optical waveguide, an optically functional cladding region defined in at least a portion of said cladding, and a modulation controller configured to provide a modulating control signal to said optically functional cladding region, wherein:

said optically functional region of said cladding comprises a cladding medium configured to induce a phase shift $\Delta\phi$ in an optical signal propagating through said optically functional region in response to a control voltage V applied to said optically functional region;

said cladding medium is configured such that successive phase shifts $\Delta\phi$ of 180° are induced in said optical signal as a magnitude of said control voltage is increased in successive increments $V_\pi$ and such that said successive increments $V_\pi$ decrease in magnitude as said magnitude of said control voltage is increased;

said refractive index of said optically functional cladding region is lower than a refractive index of said optical waveguide at an operational wavelength and an operational temperature of said device;

said optical waveguide is configured to split a propagating optical signal, into first and second optical waveguide arms;

at least said second optical waveguide arm passes through said optically functional region;

said optical waveguide is configured to recombine respective propagating optical signals from said fist and second optical waveguide arms after at least one of said signals passes through said optically functional region;

said modulation controller is configured to generate an electric field in a portion of said optically functional region associated with said second optical waveguide arm through application of a biased modulating RF control signal that comprises a bias component and a variable drive component; and a magnitude and orientation of said electric field in said optically functional region of said second optical waveguide arm is sufficient to alter the refractive index of said optically functional region of said second optical waveguide arm.

* * * * *

UNITED STATES PATENT AND TRADEMARK OFFICE
CERTIFICATE OF CORRECTION

PATENT NO. : 7,016,555 B2
APPLICATION NO. : 10/658218
DATED : March 21, 2006
INVENTOR(S) : Ridgway et al.

It is certified that error appears in the above-identified patent and that said Letters Patent is hereby corrected as shown below:

Col. 18, line 34 "$AE_{DC}^2+BE_{DC}E_{RF}$" should read --$AE^2_{DC}+BE_{DC}E_{RF}$--;

Col. 20, line 29 "$\rho_w$" should read --$\eta_w$--;

Col. 20, line 30 "60° C." should read --60°C--;

Col. 20, line 30 "90° C." should read --90°C.--;

Col. 20, line 34 "60° C." should read --60°C--;

Col. 20, line 34 "90° C." should read --90°C.--;

Col. 20, line 48 "W" should read --w--;

Col. 20, line 50 "S" should read --s--;

Col. 20, line 64 "W" should read --w--;

Col. 20, line 66 "S" should read --s--;

Col. 21, line 5 "500 μm;" should read --50 μm;--;

Col. 21, line 7 "W" should read --w--;

Col. 21, line 9 "S" should read --s--;

Col. 21, line 17 "W" should read --w--;

Col. 21, line 19 "S" should read --s--;

Col. 21, line 27 "W" should read --w--;

Col. 21, line 29 "S" should read --s--;

Col. 22, line 49 "modulation" should read --modulating--;

Col. 23, line 6 "optical" should read --optically--;

Col. 24, line 26 "signal," should read --signal--;

UNITED STATES PATENT AND TRADEMARK OFFICE
CERTIFICATE OF CORRECTION

PATENT NO. : 7,016,555 B2
APPLICATION NO. : 10/658218
DATED : March 21, 2006
INVENTOR(S) : Ridgway et al.

It is certified that error appears in the above-identified patent and that said Letters Patent is hereby corrected as shown below:

Col. 24, line 31 "fist" should read --first--.

Signed and Sealed this

Fifth Day of December, 2006

JON W. DUDAS
*Director of the United States Patent and Trademark Office*